(12) United States Patent
Maddali et al.

(10) Patent No.: US 8,970,183 B2
(45) Date of Patent: Mar. 3, 2015

(54) OVERVOLTAGE LIMITER IN AN AIRCRAFT ELECTRICAL POWER GENERATION SYSTEM

(75) Inventors: Vijay K. Maddali, Rockford, IL (US); John F. Defenbaugh, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1079 days.

(21) Appl. No.: 13/006,576

(22) Filed: Jan. 14, 2011

(65) Prior Publication Data

US 2012/0182648 A1 Jul. 19, 2012

(51) Int. Cl.
*H02P 9/00* (2006.01)
*H02P 11/00* (2006.01)

(52) U.S. Cl.
USPC .............................. 322/44; 322/28

(58) Field of Classification Search
CPC .......... H02H 7/065; H02P 9/006; H02P 9/302
USPC .................. 322/44, 24, 30; 290/40 B; 361/21
See application file for complete search history.

(56) References Cited

U.S. PATENT DOCUMENTS

| | | | |
|---|---|---|---|
| 4,486,801 A * | 12/1984 | Jackovich et al. | 361/21 |
| 4,559,486 A * | 12/1985 | Spencer et al. | 322/99 |
| 4,567,422 A * | 1/1986 | Sims | 322/25 |
| 5,047,699 A * | 9/1991 | Rozman et al. | 318/400.07 |
| 5,285,344 A | 2/1994 | Heitzmann | |
| 5,508,601 A * | 4/1996 | Good et al. | 322/37 |
| 5,583,420 A | 12/1996 | Rice et al. | |
| 5,594,322 A * | 1/1997 | Rozman et al. | 322/10 |
| 5,801,516 A | 9/1998 | Rice et al. | |
| 5,903,130 A | 5/1999 | Rice et al. | |
| 6,188,203 B1 | 2/2001 | Rice et al. | |
| 6,233,129 B1 | 5/2001 | Baumgartl et al. | |
| 6,731,486 B2 | 5/2004 | Holt et al. | |
| 6,850,043 B1 * | 2/2005 | Maddali | 322/25 |
| 6,850,426 B2 | 2/2005 | Kojori et al. | |
| 7,053,594 B2 | 5/2006 | Sutardja et al. | |
| 7,292,011 B2 | 11/2007 | Beneditz | |
| 7,375,499 B2 | 5/2008 | Maddali et al. | |

(Continued)

OTHER PUBLICATIONS

U.S. Appl. No. 12/568,734, filed Sep. 29, 2009, "Permanent Magnet Generator Having Passive Flux Control".

(Continued)

*Primary Examiner* — Julio C. Gonzalez
(74) *Attorney, Agent, or Firm* — Carlson, Gaskey & Olds, P.C.

(57) ABSTRACT

A generator includes a permanent magnet generator, an exciter and a main generator mounted for rotation on a shaft. The main generator is configured to produce a voltage output. A generator control unit includes a circuit configured to provide current from the permanent magnet generator to the exciter. A switch is provided in the circuit and is configured to change between open and closed conditions. The switch is configured to flow current in the circuit in the closed condition and interrupt current flow in the open condition. An overvoltage limit controller is programmed to determine an amount of overvoltage of the output voltage exceeding a desired voltage. Either a fixed reference threshold is used or a reference threshold voltage is calculated based upon the duration in over voltage condition, and the switch is modulated between the open and closed conditions according to error between the actual output voltage and the reference threshold voltage to limit the output voltage to the desired reference threshold voltage.

7 Claims, 4 Drawing Sheets

(56) References Cited

U.S. PATENT DOCUMENTS

| | | |
|---|---|---|
| 7,558,037 B1 | 7/2009 | Gong et al. |
| 7,638,985 B2 | 12/2009 | Tandon |
| 7,656,633 B2 | 2/2010 | Kilroy et al. |
| 7,786,708 B2 | 8/2010 | Rozman et al. |
| 8,072,191 B2 * | 12/2011 | Maddali et al. .................. 322/59 |
| 2008/0043383 A1 | 2/2008 | Shah et al. |
| 2008/0238373 A1 | 10/2008 | Eldery et al. |
| 2009/0045293 A1 | 2/2009 | Rozman et al. |
| 2009/0167256 A1 * | 7/2009 | Maddali et al. .................. 322/25 |
| 2009/0296439 A1 | 12/2009 | Qi et al. |
| 2010/0007312 A1 * | 1/2010 | Petkov .................. 322/44 |
| 2010/0181969 A1 | 7/2010 | Gieras et al. |
| 2010/0284836 A1 | 11/2010 | Grosskopf et al. |
| 2012/0007425 A1 * | 1/2012 | Rozman et al. .................. 307/25 |

OTHER PUBLICATIONS

European Search Report for EP Application No. 11196211.4, Apr. 25, 2012.

* cited by examiner

OVERVOLTAGE LIMITER IN AN AIRCRAFT ELECTRICAL POWER GENERATION SYSTEM

BACKGROUND

This disclosure relates to a generator for a power generating system. In particular, the disclosure relates to an overvoltage limiting configuration and a method of limiting the output voltage of a generator to a desired voltage under overvoltage conditions.

One type of aircraft electrical power generating system includes a variable frequency generator. The variable frequency generator includes a permanent magnet generator (PMG), an exciter, and a main generator mounted for rotation on a common shaft. The shaft is driven by a prime mover.

A generator control unit (GCU) converts alternating current from the PMG to provide DC current to the exciter. Current from the exciter is fed to the main generator, which produces a voltage output.

Under some fault conditions, an overvoltage condition may result, which produces a higher than desired output voltage from the main generator. There are many strategies for limiting or preventing overvoltage conditions, but desired overvoltage protection remains lacking. For example, one typical overvoltage management strategy simply trips a switch to an open condition once a overvoltage threshold has been reached. Another strategy delays tripping the switch depending upon the duration of the overvoltage to avoid needlessly tripping the switch for a brief overvoltage spike. In both of the above strategies, once the undesired overvoltage has occurred, the generator is de-energized and effectively disabled, which may require the switch to be mechanically reset. Thus, the generator is not capable of supplying power during a persistent overvoltage condition.

SUMMARY

A method of limiting a generator voltage with a voltage limiter in an overvoltage condition is provided. The voltage limiter enables the generator to supply power during a persistent overvoltage condition without tripping the conventional overvoltage protection switch. However, if the voltage limiter is unable to maintain the output voltage below a maximum overvoltage or if the over voltage condition exists longer than allowable duration, then the conventional overvoltage switch is tripped. Thus, the voltage limiter provides an additional, intermediate safeguard to the conventional overvoltage switch.

One method includes limiting the actual POR voltage to a specified fixed threshold. A switch is modulated to maintain the output voltage to the specified voltage, enabling the generator to continue to supply power throughout an overvoltage condition.

Another method includes limiting the actual POR voltage to a varying threshold profile. The varying threshold profile becomes active when the POR voltage exceeds a specified minimum over voltage threshold. The varying threshold profile starts at an upper overvoltage threshold level and continues to decrease as a function of time. A switch is modulated according to voltage error between the actual POR voltage and the reference threshold voltage. Excitation current flow within the generator is interrupted based upon the voltage error to limit the actual POR voltage to no more than the specified voltage iteratively, thus, enabling the generator to continue to supply power throughout an overvoltage condition.

A generator includes a permanent magnet generator, an exciter and a main generator mounted for rotation on a shaft. The main generator is configured to produce a voltage output. A generator control unit includes a circuit configured to provide required direct current to the exciter from the permanent magnet generator source. In addition to the exciter field drive circuitry that normally regulates the POR voltage output from the main generator by controlling the exciter field current, a limiting switch is also provided in the circuit and is configured to change between open and closed conditions. The switch is configured to flow current in the circuit in the closed condition and interrupt current flow in the open condition thereby regulating the power going to the exciter drive circuitry.

An overvoltage limit controller is programmed to determine an amount of overvoltage of the output voltage (actual POR voltage) exceeding a reference threshold voltage. A reference threshold voltage is either a specified fixed voltage or a varying voltage as a function of time. The varying voltage profile is activated when the output voltage exceeds a specified minimum voltage (lowest threshold voltage level that sets the over voltage condition). The switch is modulated between the open and closed conditions based upon the error between the actual POR voltage and reference threshold voltage thereby limiting the actual POR voltage to the reference threshold voltage.

BRIEF DESCRIPTION OF THE DRAWINGS

The disclosure can be further understood by reference to the following detailed description when considered in connection with the accompanying drawings wherein.

DETAILED DESCRIPTION

Figure 1:
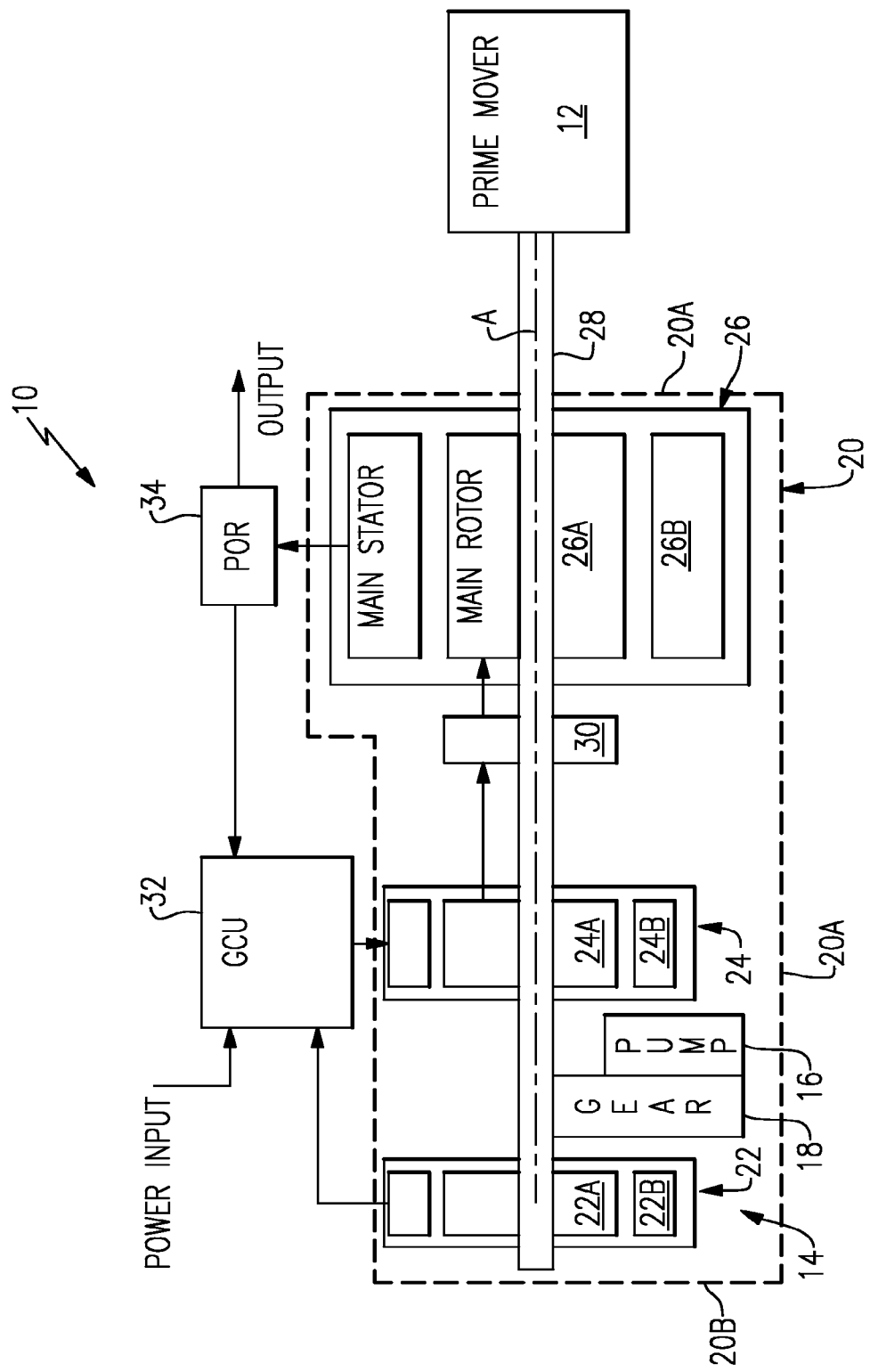
FIG. 1 is a general schematic sectional view of a generator for a gas turbine engine.

FIG. 1 schematically illustrates selected portions of an example generator 10 driven by a prime mover 12 such as a gas turbine engine and for generating electrical current when being driven by the prime mover 12. The generator 10 may generally include a dynamoelectric portion 14, hydraulic pump 16 and a gear train 18, all contained within a common housing assembly 20.

The dynamoelectric portion 14 in the disclosed exemplary embodiment is a 3-phase machine that includes three machines 22, 24 and 26 mounted on a rotor shaft 28 along an axis of rotation A. Stator assemblies 22B, 24B, 26B of the three machines are installed in the housing assembly 20, and the three rotor assemblies 22A, 24A, 26A are installed on the rotor shaft 28. The housing assembly 20 may be closed with a drive end cover assembly or housing portion 20A, through which the rotor shaft 28 extends, and an end plate 20B.

The first machine 22 includes a permanent magnet generator (PMG) with a rotor assembly 22A and a stator assembly 22B. The stator assembly 22B supplies power for generator excitation, as well as power for other components of the electrical system. The second machine 24 includes an exciter with a rotor assembly 24A and a stator assembly 24B. The exciter receives field excitation from the PMG through a GCU 32 (Generator Control Unit). The output of the rotor assembly 24A is supplied to a shaft mounted diode pack 30. The diode pack 30 may be divided into six diode groups to provide a 3-phase full wave bridge rectification. The DC output of the diode pack 30 supplies the third machine 26, or main generator, which provides a desired output voltage from a POR 34 (Point of Regulation).

Figure 2:
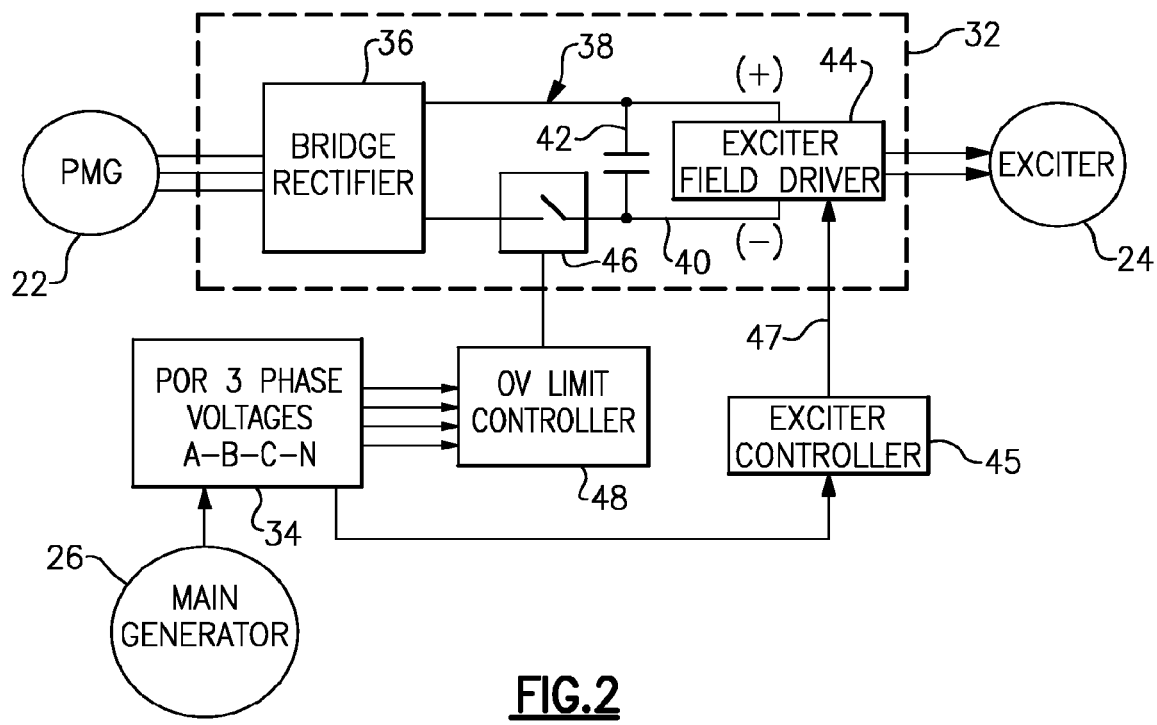
FIG. 2 is a schematic view of an overvoltage protection arrangement for a generator.
Figure 2A:
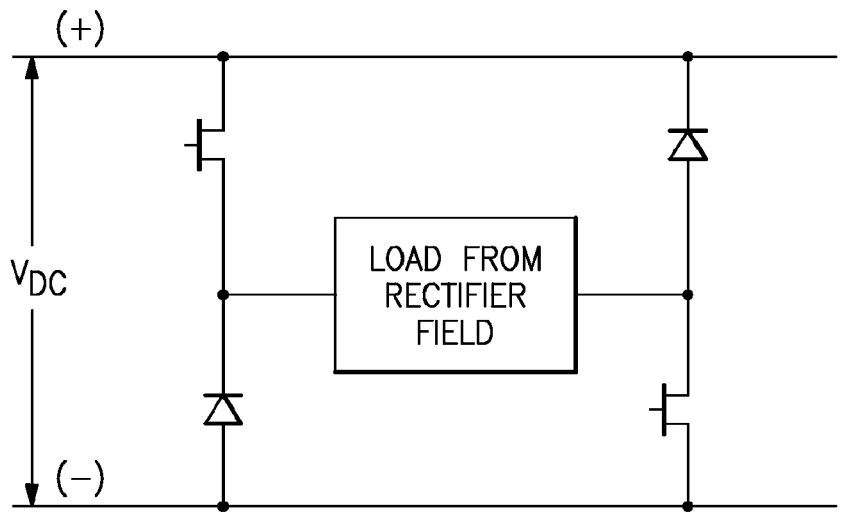
FIG. 2A is a schematic view of an exciter field driver shown in FIG. 2 with an H-bridge including a pair of MOSFETs and a pair of flyback diodes.

Portions of the GCU 32 are illustrated in more detail in FIG. 2. The GCU 32 includes a bridge rectifier 36 that converts 3-phase alternating current from the PMG 22 to DC power. The bridge rectifier 36 is arranged in a circuit 38 with an exciter field driver 44, which provides power to the exciter 24. In one example, the exciter field driver 44 includes an H-bridge having a pair of MOSFETs and a pair of fly-back diodes.

A capacitor 42 is provided in the circuit 38 to reduce the DC voltage ripple from the bridge rectifier 36. An exciter controller 45 is electrically connected between the POR 34 and the exciter field driver 44. The exciter controller 45 receives point of regulation (POR) voltage from the POR 34 and provides a desired voltage/current command signal 47 in response thereto to the exciter field driver 44 to achieve the desired output voltage from the main generator 26. A faulty desired voltage/current command signal may result in improper control of the exciter field driver 44 thereby resulting in an overvoltage condition. The exciter field driver may also include a conventional overvoltage protection switch that trips if a maximum overvoltage is exceeded or the duration of overvoltage condition exceeds allowable limits.

A switch 46, such as a MOSFET, is provided in the circuit in a return path 40 from the exciter field driver 44 to the bridge rectifier 36. The switch 46 includes open and closed conditions. Current flows through the circuit 38 in the closed condition, and current flow is interrupted in the open condition. An overvoltage limit controller 48 is electrically connected to the switch 46 and receives signals from the POR 34. The overvoltage limit controller 48 determines an amount of overvoltage exceeding a specified voltage in an overvoltage condition by detecting all three phase voltages. In one example, the specified voltage for over voltage condition for the main generator 26 may be 240 volts. The point of regulation (POR) voltage from the main generator 26 may be 300 volts for example, corresponding to an overvoltage condition. In one implementation of the voltage limiter, the overvoltage threshold for the limiter may be set at a fixed value of 280 V. The overvoltage limit controller 48 then modulates the switch 46 to limit the POR voltage 34 to 280 V as long as the overvoltage condition exists. Thus, the generator 10 can continue to supply power to a component, such as an aircraft system.

Figure 3:
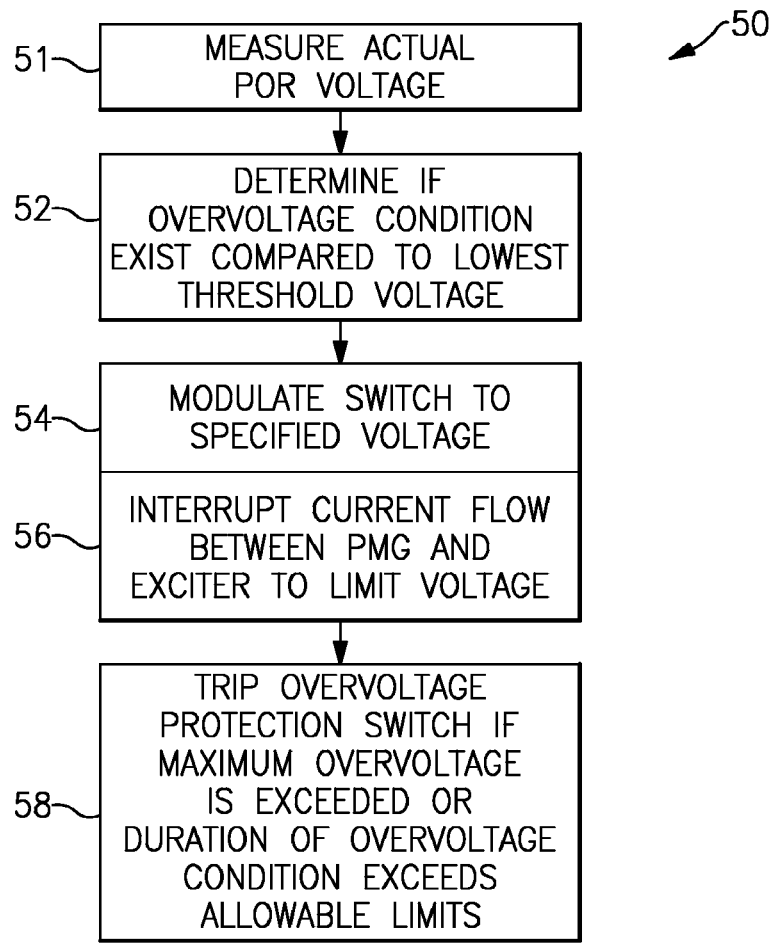
FIG. 3 is a flow chart illustrating a method of limiting a generator voltage in an overvoltage condition.

Referring to FIG. 3, a method of limiting overvoltage of the generator is generally indicated at 50. The actual POR voltage is measured, as indicated at block 51. The amount of overvoltage is compared to a specified voltage (for example, 280V), which can be the lowest threshold voltage considered as overvoltage, as indicated at block 52. The switch is modulated to maintain the output voltage at the specified voltage throughout the overvoltage condition, as indicated at block 54. As a result, the current flow between the PMG and exciter is interrupted to limit the voltage (block 56). If the overvoltage limit controller is unable to maintain the output voltage at or below the specified voltage and/or the output voltage exceeds a maximum overvoltage or the duration of overvoltage condition exceeds allowable limits, then the conventional voltage protection switch may be tripped, as indicated at block 58.

In another implementation, the overvoltage limit controller 48 uses a reference voltage threshold based upon the duration of the overvoltage condition, and modulates the switch 46 to limit the POR voltage to the reference voltage threshold; the longer the duration, the lower the reference voltage threshold will be. This varying threshold profile starts at an upper overvoltage threshold, which is less than the maximum overvoltage, and continues to decrease as a function of time. This process occurs iteratively such that the actual POR voltage converges on the desired voltage below the specified voltage.

A rate of change of voltage may also be used in combination with the POR voltage to allow limiting the voltage sooner in the case of rapidly changing POR voltages.

The overvoltage limit controller commands the switch open and closed to interrupt current flow within the circuit 38 based upon the error between the actual POR voltage, or a combination of actual POR voltage and weighted rate of change in voltage, and the reference threshold voltage to limit the output voltage (actual POR voltage) to the desired voltage. The rate of open and close of the switch is determined by the degree of hysteresis provided at the reference voltage threshold. That is, operation of the switch 46 based upon the reference voltage threshold will achieve the desired voltage at the main generator. For example, an output voltage of 300V may necessitate the switch to be modulated OFF and ON for 40 ms into the overvoltage condition to limit the output voltage to 300V and then continue to limit the output voltage to lower voltages as time progresses.

Figure 4:
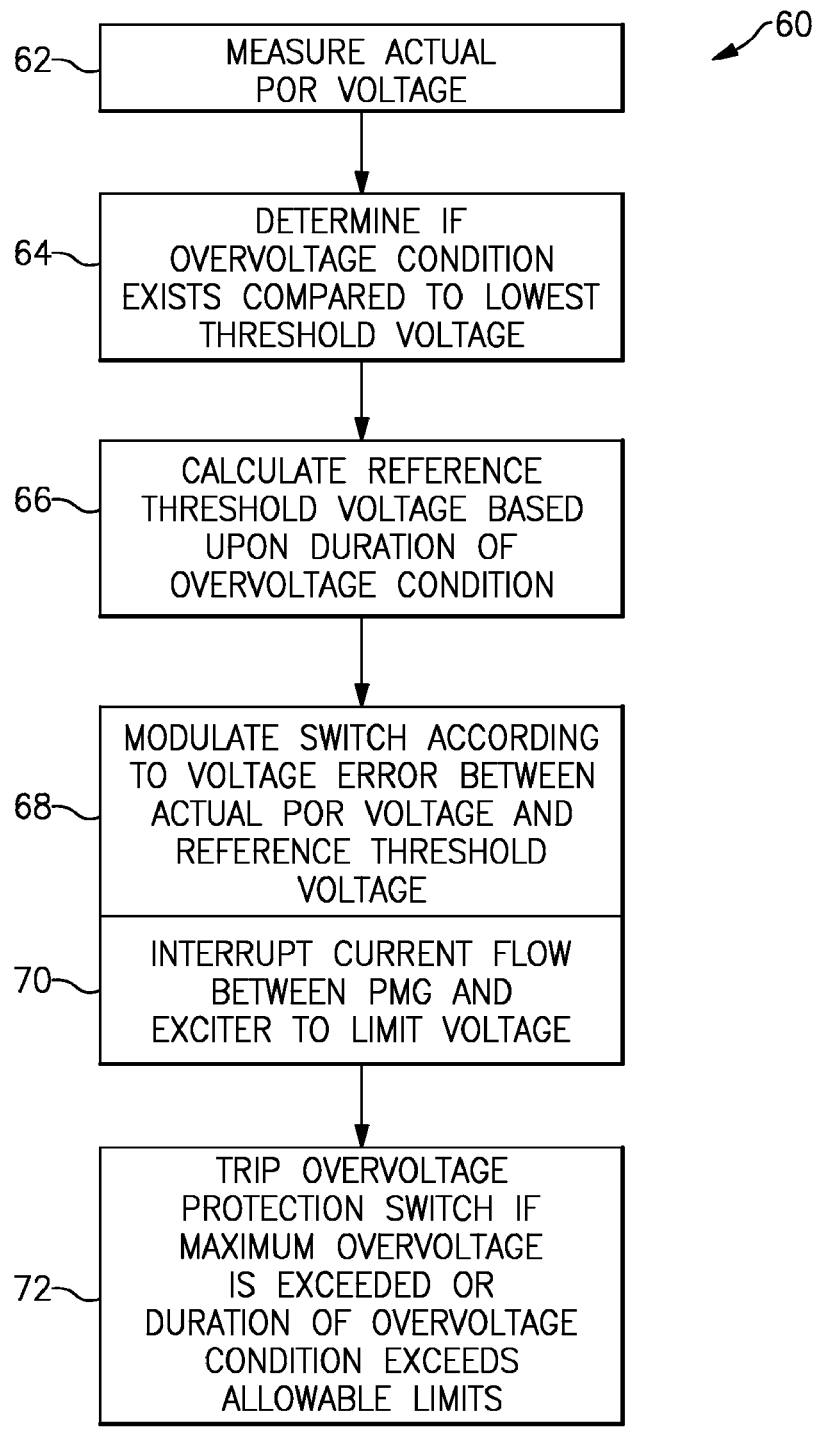
FIG. 4 is a flow chart illustrating another method of limiting a generator in an overvoltage condition.

This method of limiting overvoltage of the generators is generally indicated at 60 in FIG. 4. The actual POR voltage is measured, as indicated at block 62. The amount of overvoltage is compared to a specified voltage, which is the lowest threshold voltage considered as overvoltage, as indicated at block 64. A reference threshold voltage is calculated based upon the duration of overvoltage (block 66). The switch is modulated according to a voltage error between the actual POR voltage and reference threshold voltage, as indicated at block 68. As a result, the current flow between the PMG and exciter is interrupted to limit the voltage (block 70). The steps of blocks 66, 68, 70 may be repeated to iteratively converge upon the desired voltage and achieve an output voltage at or below the specified voltage. If the overvoltage limit controller is unable to maintain the output voltage at the specified voltage and/or the output voltage exceeds a maximum overvoltage or the duration of overvoltage condition exceeds allowable limits, then the conventional voltage protection switch may be tripped, as indicated at block 72.

The switch 46 can be used and tripped when implementing the conventional voltage protection feature. That is, the same switch can be used for both overvoltage limiting and overvoltage protection.

Although an example embodiment has been disclosed, a worker of ordinary skill in this art would recognize that certain modifications would come within the scope of the claims. For that reason, the following claims should be studied to determine their true scope and content.

What is claimed is:
1. A generator comprising:
    a permanent magnet generator, an exciter and a main generator mounted for rotation on a shaft, the main generator configured to produce a voltage output;
    a generator control unit including a circuit configured to provide current from the permanent magnet generator to the exciter;
    a switch provided in the circuit and configured to change between open and closed conditions, the switch config- ured to flow current in the circuit in the closed condition and interrupt current flow in the open condition;

an overvoltage limit controller programmed to determine an amount of overvoltage of the output voltage exceeding a specified voltage, use a fixed reference threshold voltage or use a varying reference threshold voltage based upon the duration of overvoltage, and modulate the switch between the open and closed conditions according to a voltage error between the output voltage and the reference threshold voltage to limit the output voltage to a desired voltage; and wherein the generator control unit includes an exciter field driver, and comprising an exciter controller configured to receive the point of regulation voltage and provide a desired voltage/current command signal to the exciter field driver to achieve the desired voltage, the overvoltage limit controller configured to modulate the switch in response to a faulty desired voltage command signal.

2. The generator according to claim 1, wherein a diode pack is electrically connected between the exciter and the main generator.

3. The generator according to claim 2, comprising a point of regulation that receives the voltage output from the main generator and is configured to provide a point of regulation voltage, the overvoltage limit controller configured to receive the point of regulation voltage and determine the amount of overvoltage based upon the point of regulation voltage.

4. The generator according to claim 1, wherein the circuit includes a bridge rectifier and an exciter field driver, the switch electrically connected between the bridge rectifier and the exciter field driver.

5. The generator according to claim 4, wherein the circuit includes a capacitor configured to reduce a voltage ripple from the bridge rectifier, the switch electrically connected between the bridge rectifier and the capacitor.

6. The generator according to claim 5, wherein the circuit includes a return path from the exciter field driver to the bridge rectifier, the switch arranged in the return path.

7. The generator according to claim 1, wherein the exciter field driver includes an H-bridge including a pair of MOSFETs and a pair of flyback diodes.

* * * * *